Sept. 22, 1970     G. C. LEHMANN ET AL     3,529,749
MOTOR OPERATED DISPENSER
Filed March 27, 1968     2 Sheets-Sheet 2
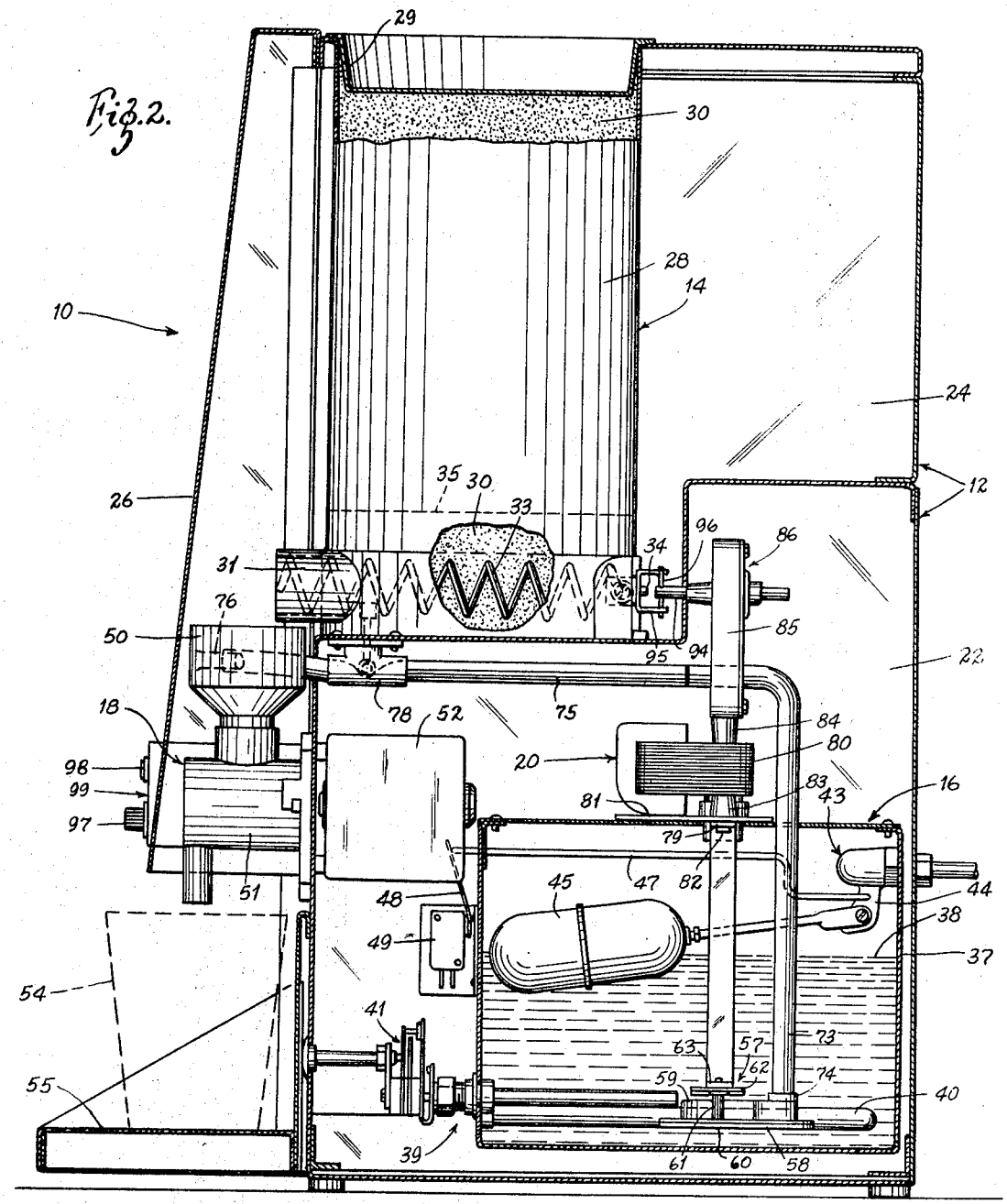
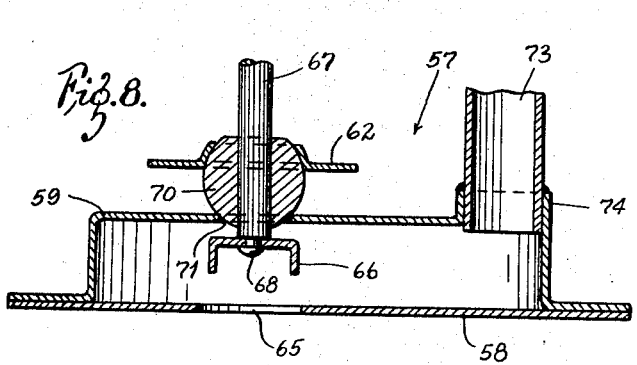
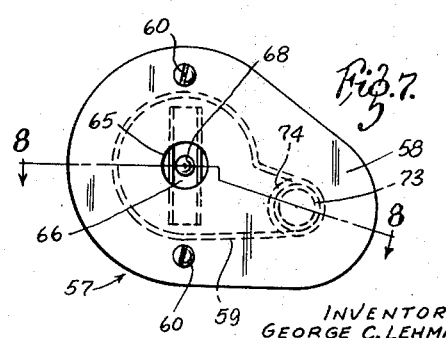
INVENTORS:
GEORGE C. LEHMANN,
FRANK A. SLADE.
BY Kingsland, Rogers, Ezell, Eilers & Robbins
ATTORNEYS

United States Patent Office 3,529,749
Patented Sept. 22, 1970

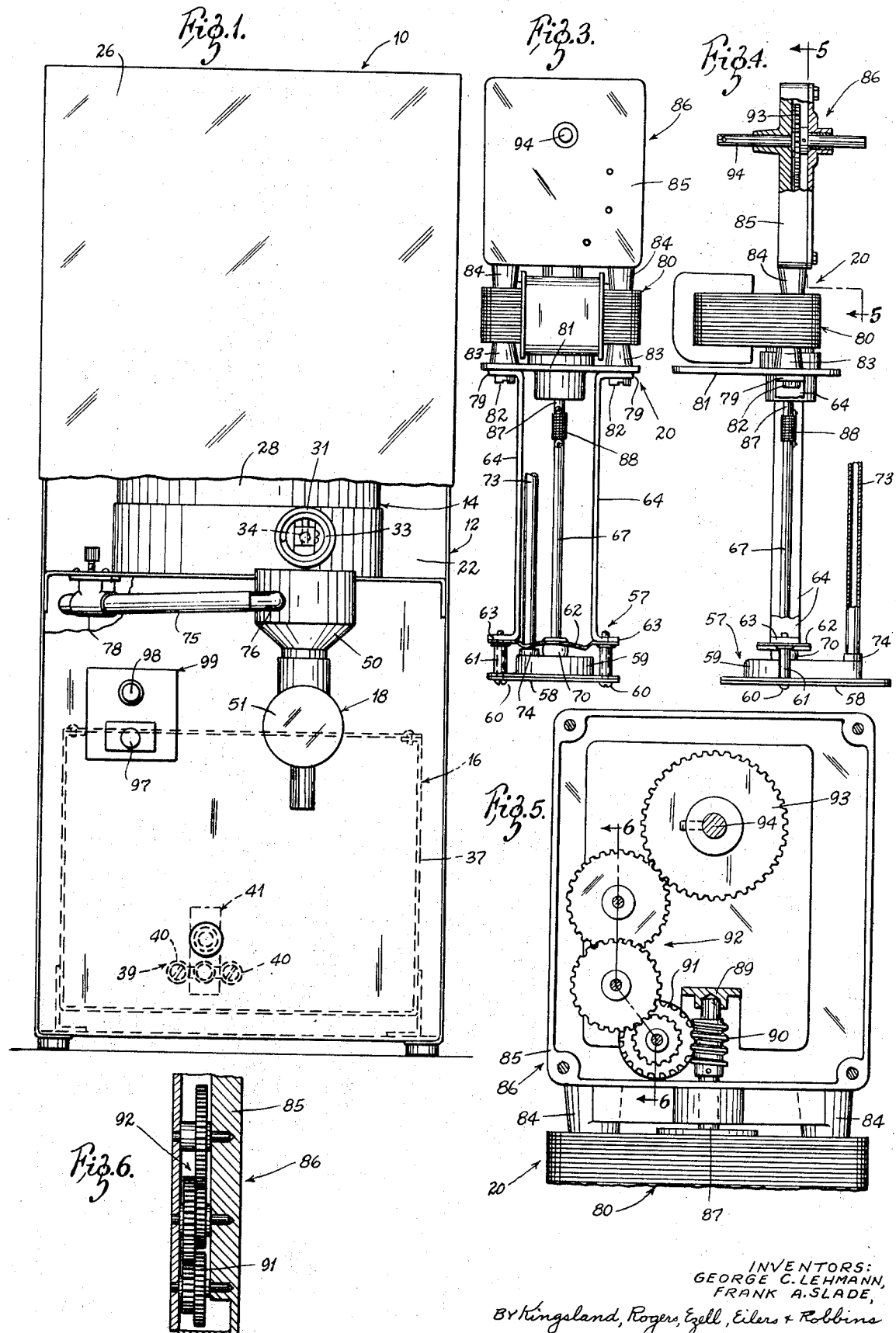

3,529,749
MOTOR OPERATED DISPENSER
George C. Lehmann, St. Louis, and Frank A. Slade, Bridgeton, Mo., assignors to Hercules Galion Products, Inc., Galion, Ohio, a corporation of Delaware
Filed Mar. 27, 1968, Ser. No. 721,546
Int. Cl. B67d 5/56
U.S. Cl. 222—66                                       12 Claims

ABSTRACT OF THE DISCLOSURE

A mixed drink dispensing machine comprising a casing, a mixing chamber, a dry materials container and an auger therein for metering the same, a liquid material container and a pump therein for moving measured liquid therefrom, a single electric motor operatively connected to the auger and to the pump for simultaneously rotating the auger and actuating the pump to discharge liquid and dry materials in predetermined proportions into the mixing chamber for transient mixing and discharge into a provided cup, and a normally open manually operated momentary contact control switch for the motor.

BACKGROUND OF THE INVENTION

Field of the invention

The present invention relates generally to mixed drink dispensers, and more particularly to a novel power assembly for effecting delivery of two drink materials to a predetermined point.

Description of the prior art

In the prior art are many structures for dispensing mixed drinks. In the applicants' knowledge, these include an individual power means for effecting delivery of each drink material. There has long been the need for an effective, simple, single power assembly, which the applicants' novel structure supplies.

SUMMARY OF THE INVENTION

In brief, the present novel power assembly includes a single electric motor with a rotor shaft extending to both sides of the rotor, a rotary pump operatively connected to one end of the rotor shaft, a dry materials dispensing auger operatively connected to the other end of the rotor shaft, and electrical controls for cycling operation of the power assembly.

Objects of the invention are to provide a novel power assembly for dispensing mixed drinks and the like which provides positive measured flow of materials for substantially simultaneous delivery to a mixing point, which is effective as required as an open system, which mechanically and accurately delivers the predetermined amounts of material substantially simultaneously to a mixing point, which can be set up for operation on a selected manual continuous draw of mixed drink or on an automatic cycle to dispense a drink of predetermined number of ounces, which provides water drain back to the container to insure hot water in each hot drink, which handles various powdered or granular materials, which is compact in structure, which is rugged and adapted for long trouble-free operation, which requires minimum maintenance, and which otherwise fulfills the objects and advantages sought.

The foregoing and other objects and advantages are apparent from the description below taken with the accompanying drawings.

FIG. 1 is a front elevational view of a hot chocolate and the like mixing and dispensing machine incorporating the principles of the present invention, the lower portion of the front shield being broken away and the cup holder being removed for illustration of details;

FIG. 2 is a side elevational view thereof, the cabinet, front shield and water tank being in section for illustration of interior working parts;

FIG. 3 is a front elevational view of the novel power assembly including the water pump, the gear box for the chocolate feeding auger, and the motor therebetween which operates both;

FIG. 4 is a side view thereof, parts being in section for illustration of details;

FIG. 5 is an enlarged vertical cross-sectional view taken on substantially the line 5—5 of FIG. 4;

FIG. 6 is a vertical cross-sectional view taken on substantially the line 6—6 of FIG. 5;

FIG. 7 is a bottom plan view of the pump; and

FIG. 8 is an enlarged vertical cross-sectional view taken on substantially the line 8—8 of FIG. 7.

DETAILED DESCRIPTION OF THE DRAWINGS

Referring to the drawings more particularly by reference numerals, 10 indicates generally a hot chocolate and the like mixing and dispensing machine constructed in accordance with the teachings of the present invention. The machine 10 includes broadly a cabinet 12, a dry material unit 14, a liquid material unit 16, a mixing unit 18 receiving measured dry and liquid materials for mixing, a power assembly 20 for simultaneously effecting movement of measured quantities of dry and liquid materials to said mixing unit 18, and suitable electrical circuitry and mechanical connecting elements.

The cabinet 12 is generally rectangular in shape, as shown, and includes a lower compartment 22 and an upper compartment 24. The walls of the cabinet 12 are panels which may be secured together by screws, nuts and bolts, welding, and the like, as desired. An angularly disposed shield panel 26 is mounted on the front of the cabinet 12 to hide the mixing unit 18 (FIG. 2).

The dry materials unit 14 comprises a container 28 disposed within the upper compartment 24 having a removable top 29 and adapted to hold powdered chocolate 30 and the like.

Mounted at the bottom of the container 28 is a horizontal tube 31 having an open top to receive dry material, as chocolate 30, a free open end of which extends through the wall of the container 28 and through the front panel of the cabinet 12 into position above the mixing unit 18 (FIG. 2). Within the tube 31 is an open center auger 33 of predetermined specifications having one end extending into the free open end thereof, which is adapted upon being rotated in one direction at a given number of revolutions per minute to move a predetermined amount of chocolate 30 to and beyond the free open end of the tube 31 for gravity deposit in the mixing unit 18. The usual false bottom is provided in the container 28, indicated by broken line 35 in FIG. 2, which slopes to the open top of the sleeve 31. The other end of the tube 31 is closed by the wall of the container 28. The other end of the auger 33 comprises an axial shaft portion 34 which extends through the wall of the container 28 for power rotation of the auger 33, as appears infra.

The liquid material unit 16 includes a tank 37 which is disposed in the lower compartment 22. The tank 37 receives water 38 and the like which is maintained at a desired temperature by a conventional electric heater unit 39 comprising heating elements 40 mounted in the front wall of the tank 37 and an adjustable automatic on and off control switch 41 disposed adjacent thereto exteriorly of said tank 37 (FIG. 2). A conventional float valve 43 is mounted on the rear wall of the tank 37 which has a pivotally mounted arm 44 for closing and opening the interiorly disposed valve element. Adjustably connected to the arm 44 for movement therewith is a float 45 for pivoting the former. Pivotally connected to the arm 44 is a shaft 47 which extends through the front wall of the tank 37 and operatively engages an actuating arm 48 of a limit switch 49 which opens all electrical circuits of the machine 10 upon the water 38 falling to a predetermined low level to render the machine 10 inoperative.

The mixing unit 18 comprises a materials receiving funnel member 50, a mixing chamber 51 having mixing blades therein (not shown), and a small electric motor 52 mounted by suitable brackets on the front wall of the lower compartment 22 (FIG. 2). The mixing unit 18 presently employed in applicants' dispensing machine 10 is purchased as a package from Vend-O-Matic Sales, Inc., Minneapolis, Minn., although other assemblages, of course, will perform the job of mixing and discharging the supplied dry and liquid materials.

In FIG. 2, a drink receiving cup 54 is illustrated in broken lines on a removable platform 55.

The novel power assembly 20 comprises a pump 57 having a base plate 58 and an inverted cup 59 of irregular shape, as shown. Machine screws 60 extending through openings in the plate 58 and in the flange of the cup 59, tubular spacers 61, a small elongated spring plate 62 formed as shown, and threadedly engaging threaded apertures in the lower flanges 63 of opposed legs 64 suspend the cup 59 and the plate 58 from the legs 64. The base plate 58 has a small opening 65 for the passage of water 38. Within the inverted cup 59 is an impeller 66 which is mounted on the lower end of a vertical shaft 67 by swaging or peening over the reduced lower extremity of the shaft as suggested at 68 (FIGS. 7 and 8). The shaft 67 extends through a spherical self-aligning bearing 70 disposed in a seat 71 in the cup 59, the bearing 70 being maintained in position by the flexible plate 62. A vertical liquid discharge pipe or tube 73 communicates with the pump 57 through the cup 59 by means of an open boss 74 to which it is anchored by brazing, welding or otherwise. The tube 73 is connected to a horizontal flexible vinyl plastic tube 75, which runs through a simple adjustable flow restrictor pinch type valve 78, as shown in FIGS. 1 and 2, for regulating the flow of liquid and is connected to a nipple 76 formed integral with and leading into the funnel 50.

Upper flanges 79 of the opposed legs 64 are secured to the bottom of a plate 81 by machine screws 82, which also extend up through spacers 83 integral with the plate 81, then through the stator of a small fractional horsepower electric motor 80, and threadedly engage tapped depending spacers or bosses 84 integral with the casing 85 of a reduction gear unit 86 to secure the aforesaid elements together as a unit. By reference to FIG. 2, it will be noted that the plate 81 is disposed on the top panel of the tank 37 as a support for the power assembly 20. Bracing may be provided, if needed. The lower extension of the rotor shaft 87 of the motor 80 is operatively secured to the shaft 67 by a suitable connector means, as the coiled spring element 88, for driving the pump impeller 66 (FIGS. 3 and 4).

The upper portion of the rotor shaft 87 extends through the lower wall of the casing 85 of the reduction gear unit 86 and engages in a bearing cup 89 formed integral with a side wall of the casing 85, which may be a casting (FIG. 5). On the rotor shaft 87 is a worm 90 engaging a worm gear 91, the initial gear of a train of gears generally designated 92. Manifestly, the gear train 92 may comprise any desired number and relationship of gears, reduction gear units being commercially available to stated specifications.

The last gear 93 of the gear train 92 is secured to a shaft 94 rotatably mounted in the opposed side walls of the casing 85 (FIGS. 2–5). One end of the shaft 94 has a diametric opening therethrough which receives a pin 96 maintained in position by a setscrew, not shown, extending into the tapped end of the shaft 94 and engaging the pin 96 (FIG. 2). A clevis 95 is removably secured to the end portion 34 of the auger 33 for rotation therewith and has its parallel arms in position for rotative pushing engagement at opposite sides by the ends of the pin 96. Thus, the auger 33 is driven by the shaft 94 on rotation of the latter.

An on-off push button 97 of a normally open, manually operated, momentary contact switch is provided for energizing an electrical circuit through the power unit 30 and motor 52. An operator, as a counter man, holds the button in until the cup 54 is filled and releases it. Thus, any required number of ounces can be dispensed. A pilot light 98, preferably red, indicates that power is on and that there is water in the machine 10. The circuits are conventional.

The operation of the dispensing machine 10 is clear from the foregoing detailed description. Assuming water 38 is hot, and chocolate 30 available, upon pushing the button 97 the motor 80 of the power assembly 20 is energized simultaneously to rotate the pump impeller 66 to discharge a predetermined quantity of water 38 into the funnel 50 and to rotate the auger 33 to discharge a predetermined quantity of chocolate 30 into the funnel 50. The motor 52 also being energized, rotates blades in the mixing chamber 51 to whip the water 38 and chocolate 30 into a delicious chocolate drink as the ingredients pass therethrough.

It is manifest that there has been provided a novel mixed drink dispensing machine and sub-assemblies thereof which fulfill the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, a mixed drink dispensing machine comprising a casing, means in said casing for holding dry materials, means for discharging measured quantities of dry materials from said dry materials holding means, means in said casing for holding liquids, means for discharging measured quantities of liquid from said liquid holding means, means for receiving and mixing measured quantities of dry materials and liquid materials, and a single electric motor including a rotor shaft extending from opposite sides of said motor, one end of said shaft being operatively connected with said dry materials discharging means and the other end being connected with said liquid discharge means for simultaneously activating said dry materials discharging means and said liquid discharge means to substantially simultaneously discharge measured dry and liquid materials into said receiving and mixing means.

2. The combination of claim 1 in which said dry materials discharging means includes a rotatably mounted auger.

3. The combination of claim 1 in which said liquid discharge means includes a liquid pump.

4. The combination of claim 1 in which said dry materials discharging means includes a rotatably mounted auger and said liquid discharge means includes a liquid pump.

5. The combination of claim 4 including gear reduction means operatively connected to said rotor shaft and to said auger.

6. The combination of claim 5 and including means for automatically maintaining said liquid material at a predetermined temperature.

7. The combination of claim 1 and including control means for effecting energization of said drink dispensing machine.

8. The combination of claim 1 and including means for rendering the power means inoperative upon the occurrence of a predetermined low amount of liquid.

9. In combination, a power assembly for a mixed drink machine comprising an electric motor including a rotor shaft, a pump for moving liquid to a predetermined point including a rotatable shaft, means operatively connecting said rotatable shaft to one end of said rotor shaft, an auger and the like for moving dry material to said predetermined point, and means operatively connecting said auger to the other end of said rotor shaft, whereby actuation of said motor effects simultaneous actuation of said pump and auger to move liquid and a dry material to said predetermined point.

10. The combination of claim 9 in which said second connecting means includes gear reduction means between said other end of said rotor shaft and said auger.

11. The combination of claim 9 and including control means for energizing said power assembly.

12. The combination of claim 11 and including means for rendering the power assembly inoperative upon the occurrence of a predetermined low amount of liquid.

References Cited

UNITED STATES PATENTS

| 740,699 | 10/1903 | Schrader | 222—139 |
| 1,401,193 | 12/1921 | Schetzel | 103—92 |
| 1,527,406 | 2/1925 | Hansen | 222—139 X |
| 2,601,943 | 7/1952 | Torrese | 222—129.4 |
| 2,802,599 | 8/1957 | Callahan et al. | 222—129.4 |
| 2,972,434 | 2/1961 | James | 222—66 |
| 3,089,618 | 5/1963 | Forsyth | 222—66 |

ROBERT B. REEVES, Primary Examiner

H. S. LANE, Assistant Examiner

U.S. Cl. X.R.

222—129.1, 138, 333